Patented Jan. 6, 1970

3,488,726
R-L-METHIONYL-GLYCYL OCTAPEPTIDES RELATED TO CAERULEIN AND INTERMEDIATES THEREFOR
Miguel A. Ondetti, North Brunswick, and John T. Sheehan, Middlesex, N.J., assignors to E. R. Squibb & Sons, Inc., New York, N.Y., a corporation of Delaware
No Drawing. Filed July 31, 1967, Ser. No. 657,005
Int. Cl. C07g 7/00; C07c 103/52; A61k 27/00
U.S. Cl. 260—112.5                                        13 Claims

ABSTRACT OF THE DISCLOSURE

This application relates to two novel octapeptide amides of the general formula

R—Met—Gly—Try—Met—Asp—Phe—NH$_2$ wherein R is selected from the group consisting of Tyr—Asp and Asp—Tyr, and to the intermediates and their salts employed in the preparation thereof.

The final products of this invention, as well as the pharmaceutically acceptable salts thereof have been found to possess cholecystokinin activity.

---

This invention relates to two novel octapeptide amides of the general formula

R—Met—Gly—Try—Met—Asp—Phe—NH$_2$ wherein R is selected from the group consisting of Tyr—Asp and Asp—Tyr, and to the intermediates and their salts employed in the preparation thereof.

Peptide salts encompassed by the above include, for instance, hydrochlorides, hydrobromides, acetates, fluoroacetates, such as trifluoroacetate, chloroacetates such as dichloroacetate, and the like, as well as ammonium salts such as dicyclohexylammonium, triethylammonium, morpholinium, pyridinium, and the like.

The final products of this invention are the peptide amides containing eight amino acid residues of the amino acids L-tyrosine (Tyr), L-aspartic acid (Asp), L-methionine (Met), glycine (Gly), L-tryptophane (Try) and L-phenylalanine (Phe).

These products have been found to possess cholecystokinin activity. That is, they have the ability to stimulate the contraction of the gall bladder. Thus, they find utility as diagnostic acids in X-ray examination of the gall bladder in the same manner as cholecystokinin. For such purposes, they may be administered either intravenously or subcutaneously to an animal species (e.g., cats or dogs) in a single dosage of about 0.3 to 1.0 mg./kg. of body weight.

For this purpose, they may be administered parenterally by incorporating the appropriate dosage of the compound with carriers to form injectables according to standard pharmaceutical practice.

To prepare compounds of this invention wherein R represents Asp—Tyr, a protected L-methionylglycine is first prepared. This is accomplished by the reaction of an activated, protected L-methionine with glycine. The protected dipeptide is then converted to a free dipeptide, and this is reacted with an activated, protected L-tyrosine to form a protected tripeptide. The L-aspartic acid residue is added by following the same reaction sequence, and the resulting tetrapeptide is then converted to an active form, such as its p-nitrophenyl ester, and interacted with the tetrapeptide amide, Try—Met—Asp—Phe—NH$_2$, to form the protected octapeptide amide. Upon removal of the protecting group, the desired octapeptide amide is obtained.

The preparation of compounds of this invention wherein R represents Tyr—Asp employs as the starting material, the pentapeptide amide Gly—Try—Met—Asp—Phe—NH$_2$. To this amide, the amino acid residues of L-methionine, L-aspartic acid and L-tyrosine are added in order by following the procedure set forth above. In this manner, the peptide chain is built up to provide the desired octapeptide amide.

An alternative method of preparing compounds of this invention wherein R represents Asp—Tyr by following this latter method, but changing the order of addition, to L-methionine, L-tyrosine, and finally, L-aspartic acid.

Among the suitable activating groups to be employed in the above process may be mentioned any group which causes the acid function to become more reactive, such as mixed anhydrides, (which normally involves the acylation of an amine with the mixed anhydrides of, for instance, an acyl amino acid and isovaleric acid), azides, acid chlorides, reaction products with carbodiimides, reactive N-acyl compounds, O-acyl hydroxylamine derivatives, and active esters, such as alkyl esters with electron attracting (negative) substituents, vinyl esters, enol esters, halophenyl esters, thiophenyl esters, nitrophenyl esters, 2,4-dinitrophenyl esters, and nitrophenylthiol esters.

In forming peptide sequences of this invention in accordance with the above process, the amino functions may be protected by commonly used amino protecting groups such as benzyloxycarbonyl, tertiary butyloxycarbonyl, phthalyl, o-nitrophenylsulfenyl, tosyl, and so forth. Methyl, ethyl, tertiary butyl, benzyl and so forth may be used to protect the carboxyl groups, and the hydroxyl protecting groups may be benzyl, tert. butyl, tetrahydropyranyl and so forth.

The protecting groups are removed by known reactions such as reduction with sodium in liquid ammonia, hydrogenolysis (for instance, in the presence of a palladium on charcoal catalyst), treatment with a hydrohalo acid (such as hydrobromic or hydrochloric acid) in acetic acid or treatment with trifluoroacetic acid.

To prepare the free amines from their salts, the salts are treated with an ion exchange resin such as Amberlite IR400 or neutralized with an amine such as triethylamine. In some cases, the amine may be isolated from an aqueous solution of their salts by acidification to the proper pH.

The following examples will further illustrate the invention. All temperatures are in degrees centigrade unless otherwise stated.

EXAMPLE 1

Tert-butyloxycarbonyl-L-methionylglycine

Glycine (1.87 g.) is dissolved in a mixture of water (45 ml.) and pyridine (45 ml.), and the pH adjusted to 8.5 with 2 N sodium hydroxide. Tert.-butyloxycarbonyl-L-methionine 2,4,5-trichlorophenyl ester (10.7 g.) is added in small portions with stirring and the pH kept at 8.5–8.7 with the addition of 2 N sodium hydroxide. After all the ester is added and the pH remains constant for 30 minutes, the reaction mixture is diluted with water (350 ml.) and cooled in an ice bath, acidified to pH 3 with 6 N hydrochloric acid and extracted four times with ethyl acetate. The ethyl acetate extracts are pooled, washed with water and dried over magnesium sulfate. After removing the solvent in vacuo, the residue is crystallized from ethyl acetate-hexane. Yield is 6.1 g.; M.P. (122) 125–126°.

EXAMPLE 2

Tert.-butyloxycarbonyl-L-tyrosyl-L-methionylglycine (a) Tert.-butyloxycarbonyl-L - methionylglycine (3.06 g.) is dissolved in ice-cold 1.9 N hydrochloric acid in acetic acid (25 ml.). After three hours at room temperature, ether (75 ml.) is added to complete the precipitation of the hydrochloride. The crystals are filtered, washed with ether and dried. Yield is 2.4 g.; M.P. (184) 187–188°.

(b) The L-methionylglycine hydrochloride (2.4 g.) is dissolved in an ice-cold mixture of N,N'-dimethylformamide (50 ml.) and triethylamine (2.8 ml.). To the resulting solution tert.-butyloxycarbonyl-L-tryrosine 2,4,5-trichlorophenylester (5.1 g.) is added. The reaction mixture is stirred at room temperature for 4.5 hours, diluted with ethyl acetate (400 ml.), washed once with 20% citric acid and three times with water. The ethyl acetate layer is dried over magnesium sulfate and the solvent is removed in vacuo. The residue is dissolved in ether acetate (45 ml.) and dicyclohexylamine added (2 ml.). After a three-hour storage at room temperature, the crystals of the protected tripeptide dicyclohexylammonium salt are filtered, washed with ethyl acetate and dried. Yield is 5.13 g.; M.P. (132) 139–141°.

EXAMPLE 3

$N^\alpha$-tert.-butyloxycarbonyl-$\beta$-tert.-butyl-L-aspartyl-L-tyrosyl-L-methionylglycine (a) Tert.-butyloxycarbonyl-L-tyrosyl - L - methionylglycine dicyclohexylammonium salt (3.6 g.) is dissolved in cold trifluoroacetic acid (2.8 ml.) and the solution kept at room temperature for 15 minutes. The tripeptide trifluoroacetate is precipitated by addition of ether (500 ml.), filtered, washed and dried in vacuo.

(b) This material (2.61 g.) is dissolved in cold dimethylformamide (28 ml.) and triethylamine (1.55 ml.) and tert.-butyloxycarbonyl-$\alpha$-p-nitrophenyl-$\beta$ - tert.-butyl L-aspartate added. After two and a half hours at room temperature, the reaction mixture is diluted with ethyl acetate, washed once with 20% citric acid and three times with water. The organic phase is dried with magnesium sulfate and concentrated to dryness in vacuo. The residue is triturated with ether, filtered and dried. Yield is 2.3 g.

EXAMPLE 4

$N^\alpha$-tert.-butyloxycarbonyl-$\beta$-tert.-butyl-L-aspartyl-L-tyrosyl-L-methionylglycine-p-nitrophenylester The protected tetrapeptide acid from Example 3 (192 mg.) and p-nitrophenol (46 mg.) are dissolved in a mixture of acetonitrite (1.5 ml.) and DMF (0.3 ml.), and the solution is cooled in an ice-water bath before the addition of dicyclohexylcarbodiimide (62 mg.). After a 30 minute stirring in an ice-bath and three hours at room temperature, the precipitate of dicyclohexylurea is filtered off and the filtrate is concentrated to dryness in vacuo, and the residue is disintegrated with ether, filtered, washed and dried. Yield is 186 mg.

EXAMPLE 5

$N^\alpha$-tert.-butyloxycarbonyl-$\beta$-tert.-butyl-L - aspartyl - L-tyrosyl-L - methionylglycyl-L - tryptophyl-L-methionyl-L - aspartyl - L-phenylalanine amide The protected tetrapeptide nitrophenyl ester of Example 4 (136 mg.) is added to a solution of L-tryptophyl-L-methionyl-L-aspartyl - L-phenylalanine amide trifluoroacetate (103 mg.) in a mixture of dimethylformamide (0.9 ml.) and triethylamine (0.04 ml.). After two and a half hours, acetic acid (0.02 ml.) and ethyl acetate (40 ml.) are added. The precipitate is filtered, washed with ethyl acetate and dried. Yield is 168 mg.

EXAMPLE 6

L-aspartyl-L-tyrosyl - L-methionylglycyl - L-tryptophyl-L-methionyl-L-aspartyl-L-phenylalanine amide (a) The protected octapeptide amide from Example 5 (170 mg.) is dissolved in cold trifluoroacetic acid (5 ml.) and the solution is kept at room temperature, under nitrogen, for one hour. Addition of ether precipitated the octapaptide trifluoroacetate. Yield is 150 mg.

(b) The octapeptide trifluoroacetate (150 mg.) is dissolved in buffer at pH 8.5. The resulting solution is acidified to pH 4–6 with hydrochloric acid and the precipitate is filtered, washed with water and dried. Yield is 100 mg.

EXAMPLE 7

Tert.-butyloxycarbonyl-L-methionylglycyl-L-tryptophyl-L-methionyl-L-aspartyl-L-phenylalanine amide Glycyl-L-tryptophyl - L-methionyl - L - aspartyl-L-phenylalanine amide trifluoroacetate (3.8 g.) is dissolved in a mixture of dimethylformamide (45 ml.) and triethylamine (1.4 ml.) and tert.-butyloxycarbonyl-L-methionine 2,4,5-trichlorophenyl ester (2.5 g.) added. After stirring for three hours at room temperature, the reaction mixture is diluted with ethyl acetate and the precipitate is filtered, washed with ethyl acetate and ether and dried. Yield is 3.4 g.; M.P. 180–182°.

EXAMPLE 8

$N^\alpha$-tert. - butyloxycarbonyl-$\beta$-tert. - butyl - L-aspartyl-L-methionylglycyl-L-tryptophyl - L-methionyl-L-aspartyl-L-phenylalanine amide (a) The protected hexapeptide of Example 7 (3.1 g.) is dissolved in cold trifluoroacetic acid (20 ml.) and the solution kept under nitrogen at room temperature for 25 minutes. Addition of ether (250 ml.) precipitates the trifluoroacetate which is filtered, washed with ether and dried.

(b) This hexapeptide trifluoroacetate (2.8 g.) is dissolved in a mixture of dimethylformamide (25 ml.) and triethylamine (0.85 ml.) and allowed to react with $N^\alpha$-tert.-butyloxycarbonyl-$\alpha$-p-nitrophenyl-$\beta$ - tert. - butyl-L-aspartate (1.65 g.). After five hours standing, the reaction mixture is diluted with ethyl acetate and the precipitate is filtered, washed with ethyl acetate and ether and dried. Yield is 2.45 g.; M.P. 207–209°.

EXAMPLE 9

Tert.-butyloxycarbonyl - L - tyrosyl-L-aspartyl-L-methionylglycyl - L - tryptophyl-L-methionyl-L-aspartyl - L-phenylalanine amide (a) The protected heptapeptide from Example 8(b) (2.3 g.) is dissolved in cold trifluoroacetic acid (15 ml.) and the solution stirred under nitrogen at room temperature for one hour. Dilution with ether (250 ml.) precipitates the trifluoroacetate which is filtered, washed with ether and dried.

(b) This heptapeptide trifluoroacetate (2.02 g.) is dissolved in a mixture of dimethylformamide (15 ml.) and triethylamine (0.5 ml.) and allowed to react with tert.-butyloxycarbonyl-L-tyrosine 2,4,5-trichlorophenyl ester (1.12 g.). After five hours standing, at room temperature, the reaction mixture is diluted with ethyl acetate and the precipitate is filtered, washed with ethyl acetate and ether and dried. Yield is 2.0 g.; M.P. 188–190°.

EXAMPLE 10

L-tyrosyl-L-aspartyl-L-methionylglycine-L-tryptophyl-L-methionyl-L-aspartyl-L-phenylalanine amide (a) The protected octapeptide amide of the preceding paragraph (400 mg.) is dissolved in cold trifluoroacetic acid (5 ml.) and the solution is kept under nitrogen at room temperature for 30 minutes. Addition of ether (100 ml.) precipitates the octapeptide trifluoroacetate. Yield is 368 mg.

(b) The octapeptide trifluoroacetate (368 mg.) is dissolved in buffer pH 8.5. The resulting solution is acidified with hydrochloric acid to pH 4–6 and the precipitate is filtered, washed with water and dried. Yield is 230 mg.

EXAMPLE 11

Tert.-butyloxycarbonyl - L - tyrosyl - L - methionylglycyl-L-tryptophyl - L - methionyl - L - aspartyl-L-phenylalanine amide The hexapeptide trifluoroacetate of Example 8(a) (2.8 g.) is dissolved in a mixture of dimethylformamide (25 ml.) and triethylamine (0.85 ml.) and allowed to react with tert.-butyloxycarbonyl-L-tyrosine 2,4,5-trichlorophenyl ester (1.5 g.). After five hours standing at room temperature, the reaction mixture is diluted with ethyl acetate and the precipitate is filtered, washed with ethyl acetate and ether and dried. Yield is 2.4 g.

EXAMPLE 12

$N^\alpha$-tert.-butyloxycarbonyl - β - tert.-butyl - L - aspartyl-L-tyrosyl-L-methionylglycyl - L - tryptophyl-L-methionyl-L-aspartyl-L-phenyl-alanine amide (a) The protected heptapeptide from the preceding example (2.4 g.) is dissolved in cold trifluoroacetic acid (15 ml.) and the solution stirred under nitrogen at room temperature for twenty minutes. Dilution with ether (250 ml.) precipitates the trifluoroacetate which is filtered, washed with ether and dried, Yield is 2.0 g.

(b) The hexapeptide trifluoroacetate (2.4 g.) is dissolved in a mixture of dimethylformamide (18 ml.) and triethylamine (0.6 ml.) and allowed to react with $N^\alpha$-tert.-butyloxycarbonyl-α-p-nitrophenyl-β-tert.-butyl - L - aspartate (1.5 g.) After five hours at room temperature, the reaction mixture is diluted with ethyl acetate and the precipitate is filtered, washed with ethyl acetate, and ether and dried. Yield is 2.4 g.

What is claimed is:

1. A compound of the formula R-L-methionylglycine and pharmaceutically acceptable acid addition salts thereof wherein R is selected from the group consisting of L-tyrosyl, protected L-tyrosyl and protected L-aspartyl-L-tyrosyl wherein the amino protective groups are selected from the group consisting of benzyloxycarbonyl, t-butyloxycarbonyl, phthalyl, o-nitrophenylsulfenyl and tosyl, and the carboxyl protective groups are selected from the group consisting of methyl, ethyl, t-butyl and benzyl.

2. A compound according to claim 1 having the name t-butyloxycarbonyl-L-tryrosyl-L-methionylglycine dicyclohexyl-ammonium salt.

3. A compound according to claim 1 having the name L-tyrosyl-L-methionylglycine trifluoroacetate.

4. A compound according to claim 1 having the name $N^\alpha$-t-butyloxycarbonyl-β-t-butyl-L-aspartyl-L - tyrosyl - L - methionylglycine.

5. $N^\alpha$-t-butyloxycarbonyl-β-t-butyl-L-aspartyl - L - tyrosyl-L-methionylglycine p-nitrophenylester.

6. A compound of the formula R-L-methionylglycyl-L-tryptophyl-L-methionyl-L-aspartyl-L-phenylalanine amide and pharmaceutically acceptable acid addition salts thereof wherein R represents hydrogen, a protecting group, protected-L-tyrosyl, L-tyrosyl, protected-L-aspartyl-L-tyrosyl, L-aspartyl-L-tyrosyl, protected-L-aspartyl, L-aspartyl, protected-L-tyrosyl-L-aspartyl, or L-tyrosyl-L-aspartyl wherein the amino protective groups are selected from the group consisting of benzyloxycarbonyl, tertiary butyloxycarbonyl, phthalyl, o-nitrophenylsulfenyl and toysl, and the carboxyl protective groups are selected from the group consisting of methyl, ethyl, tertiary butyl and benzyl.

7. A compound in accordance with claim 6 having the name L-methionylglycyl-L-tryptophyl-L-methionyl-L-aspartyl-L-phenylalanine amide trifluoroacetate.

8. A compound in accordance wtih claim 6 having the name t-butyloxycarbonyl-L-methionylglycyl-L-tryptophyl-L-methionyl-L-aspartyl-L-phenylalanine amide.

9. A compound in accordance with claim 6 having the name t-butyloxycarbonyl-L-tyrosyl-L-methionylglycyl-L-tryptophyl-L-methionyl-L-aspartyl-L-phenylalanine amide.

10. A compound in accordance with claim 6 having the name L-tyrosyl-L-methionylglycyl-L-tryptophyl-L-methionyl-L-aspartyl-L-phenylalanine amide trifluoroacetate.

11. A compound in accordance with claim 6 having the name $N^\alpha$-t-butyloxycarbonyl-β-t-butyl-L-aspartyl-L-tyrosyl - L - methionylglycyl - L - tryptophyl-L-methionyl-L-aspartyl-L-phenyl-alanine amide.

12. A compound in accordance with claim 6 having the name L-aspartyl-L-tyrosyl-L-methionylglycyl-L-tryptophyl-L-methionyl-L-aspartyl-L-phenylalanine amide.

13. A compound in accordance with claim 6 wherein R is L-aspartyl, L-tyrosyl-L-aspartyl, t-butyloxycarbonyl-L-tyrosyl-L-aspartyl, or $N^\alpha$-t-butyloxycarbonyl-β-t-butyl-L-aspartyl.

References Cited

UNITED STATES PATENTS 3,062,804   11/1962   Albertson _____ 260—112.5

OTHER REFERENCES

Anastasi et al.: Experientia, 24, 771–773 (1968).
Beacham et al.: Nature, 209, 585–586 (1966).
Bently et al.: Nature, 209, 583–585 (1966).
Folk et al.: Biochim. Biophys. Acta, 122, 254 (1966).
Gregory et al.: Nature, 209, 583 (1966).
Anastasi et al.: Experientia, 23, 699–700 (1967).
Bernardi et al.: Experientia, 23, 700–702 (1967).
Erspamer et al.: Experientia, 23, 702–703 (1967).

LEWIS GOTTS, Primary Examiner

MELVYN KASSENOFF, Assistant Examiner

U.S. Cl. X.R.

260—471, 479; 424—177